United States Patent
Shin

(10) Patent No.: US 9,774,026 B2
(45) Date of Patent: Sep. 26, 2017

(54) APPARATUS FOR PREVENTING OVER-CHARGE FOR BATTERY OF VEHICLE

(71) Applicant: Hyundai Motor Company, Seoul (KR)

(72) Inventor: Woo Jin Shin, Seoul (KR)

(73) Assignee: Hyundai Motor Company, Seoul (KR)

( * ) Notice: Subject to any disclaimer, the term of this patent is extended or adjusted under 35 U.S.C. 154(b) by 446 days.

(21) Appl. No.: 14/326,083

(22) Filed: Jul. 8, 2014

(65) Prior Publication Data

US 2015/0162593 A1 Jun. 11, 2015

(30) Foreign Application Priority Data

Dec. 18, 2013 (KR) .................. 10-2013-0158749

(51) Int. Cl.
H01M 2/34 (2006.01)
H04W 4/00 (2009.01)
H04W 88/08 (2009.01)

(52) U.S. Cl.
CPC ........... *H01M 2/345* (2013.01); *H04W 4/008* (2013.01); *H04W 88/08* (2013.01); *H01M 2220/20* (2013.01)

(58) Field of Classification Search
None
See application file for complete search history.

(56) References Cited

U.S. PATENT DOCUMENTS

2007/0096885 A1 5/2007 Cheng et al.
2012/0196583 A1 8/2012 Kindo

FOREIGN PATENT DOCUMENTS

| JP | 09-129214 A | 5/1997 |
| JP | 2004-007919 A | 1/2004 |
| JP | 2009-301969 A | 12/2009 |
| KR | 10-2006-0032871 A | 4/2006 |
| KR | 10-2006-0114549 A | 11/2006 |
| KR | 10-2009-0043717 A | 5/2009 |
| KR | 10-2009-0052802 A | 5/2009 |
| KR | 10-2011-0017778 A | 2/2011 |
| KR | 10-2013-0032958 A | 4/2013 |
| WO | 2008/126295 A1 | 10/2008 |
| WO | 2011-043072 A1 | 4/2011 |

OTHER PUBLICATIONS

Office Action Korean Patent Application No. 10-2013-0158749 dated Jan. 12, 2015 with English translation.

*Primary Examiner* — Daniel Gatewood
(74) *Attorney, Agent, or Firm* — McDermott Will & Emery LLP

(57) ABSTRACT

An apparatus for preventing over-charge for a vehicle battery includes a switch disposed between an adjacent battery cell and a battery cell and closely contact the battery cells when each of the battery cells swell and to form a contact. An inflator is configured to be exploded when the switch is connected. A cushion configured to be disposed between the adjacent battery cell and the battery cell and swells depending on the explosion of the inflator to cut a lead tab which connects the adjacent battery cell and the battery cell.

7 Claims, 6 Drawing Sheets

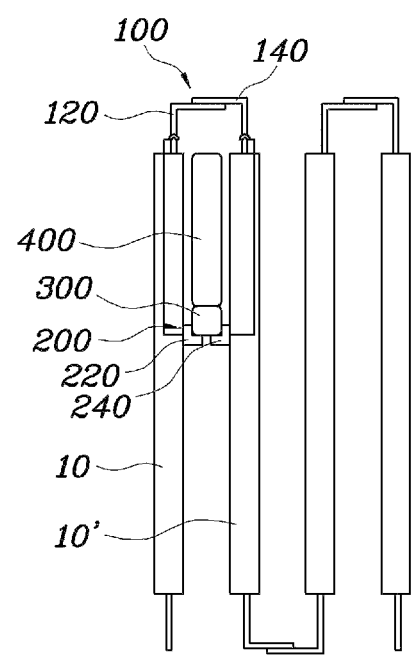
[FIG. 1]

[FIG. 2]
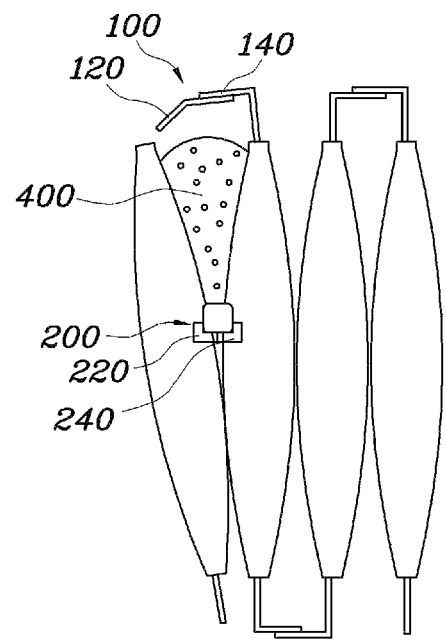
[FIG. 3]
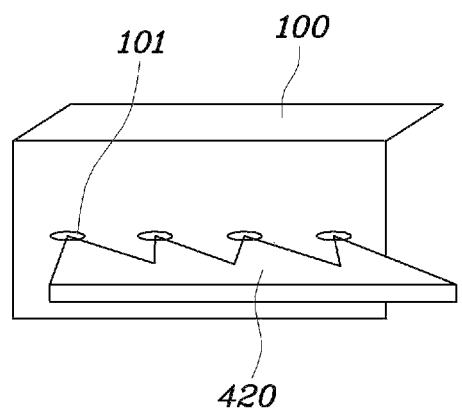

[FIG. 4]
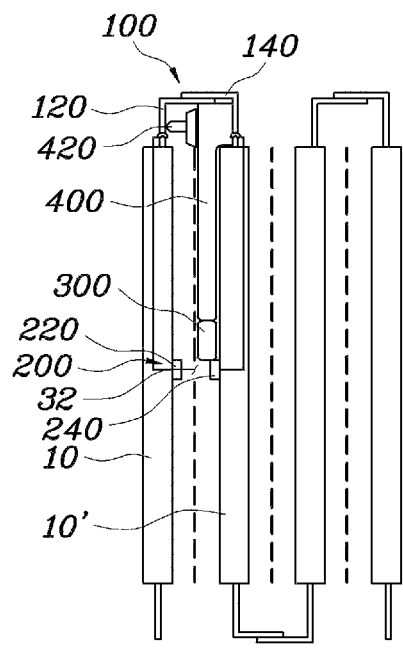

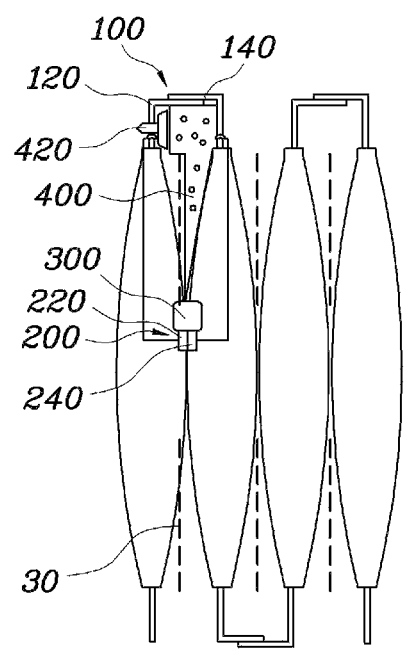
[FIG. 5]

[FIG. 6]
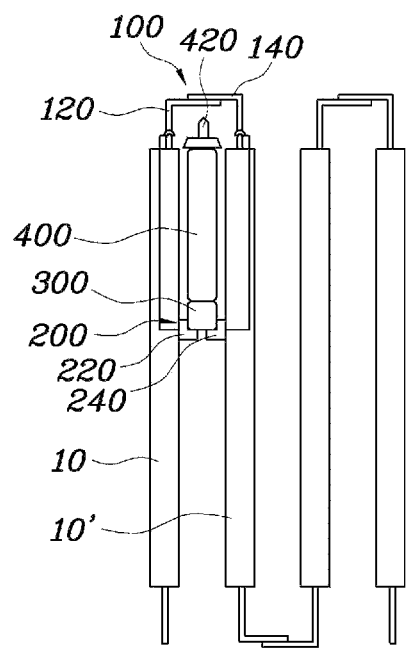

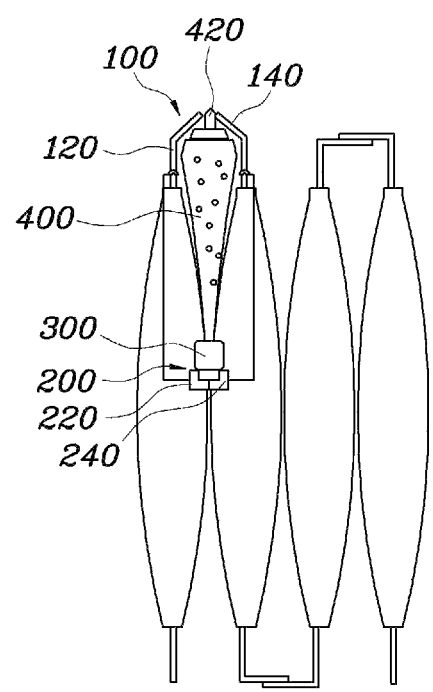
[FIG. 7]

APPARATUS FOR PREVENTING OVER-CHARGE FOR BATTERY OF VEHICLE

CROSS-REFERENCE(S) TO RELATED APPLICATION

The present application claims the benefit of priority to Korean Patent Application Number 10-2013-0158749 filed on Dec. 18, 2013, the entire contents of which application is incorporated herein for all purposes by this reference.

TECHNICAL FIELD

The present disclosure relates to an apparatus for preventing over-charge of a vehicle battery, in which contacts contact each other even though a battery cell is only a little swelled to operate the apparatus even in the state which over-charge is not considerably progressed and even a welded portion of a lead which is hardly separated due to a swelling of an air bag with a strong force may be separated.

BACKGROUND

A battery swells at the time overcharging, thus lowering durability and causing a fire. To overcome this problem, the related art has used a method of separating a welded portion between an electrode within a cell and a welded portion of a lead tab with only a swelling force of a battery cell. However, since a portion to be separated separates slowly, and even after the battery cell is swelled maximally, the portion may not completely separated in some cases.

Therefore, a flame is generated in the case in which some of separated metal portions repeatedly contact/non-contact other metal portions when electricity flows in some of the separated metal portions, thereby causing side effects.

According to an exemplary embodiment of the present disclosure, a strong force is applied at once to a path through which electricity flows to remove the path, thereby remarkably improving safety.

The matters described as the related art have been provided only for assisting in the understanding for the background of the present disclosure and should not be considered as corresponding to the related art known to those skilled in the art.

SUMMARY

The present disclosure provides an apparatus for preventing over-charge for a vehicle battery, in which contacts contact each other even though a battery cell is only a little swelled to operate the apparatus even in the state which over-charge is not considerably progressed and even a welded portion of a lead which is hardly separated due to a swelling of an air bag with a strong force may be separated.

According to an exemplary embodiment of the present disclosure, an apparatus for preventing over-charge for a vehicle battery is provided. The apparatus includes a switch disposed between an adjacent battery cell and a battery cell and closely contacting the battery cells at the time of swelling of each of the battery cells to form a contact. An inflator is configured to be exploded at the time of a connection of the switch. A cushion is disposed between the adjacent battery cell and the battery cell and swelled depending on the explosion of the inflator to cut a lead tab which connects the adjacent battery cell and the battery cell.

The switch may be disposed at a central portion between the adjacent battery cell and the battery cell, and the inflator and the cushion may be disposed at an upper or lower portion between the adjacent battery cell and the battery cell.

The cushion may be at the lead tab which connects the adjacent battery cell and the battery cell.

The lead tab may have a plurality of holes, an end of the cushion may have blades corresponding to the plurality of holes, and the lead tab may be entirely cut from the plurality of holes by the blades at the time of the swelling of the cushion.

The lead tab may have a shape in which a first lead is connected with a second lead and the cushion may extend to the lead tab in the state in which the cushion is connected with the inflator.

The end of the cushion may have the blades, the end of the cushion may swell in a space in which the lead tab is formed at the time of the swelling of the cushion, and the blades may cut the first lead or the second lead.

The end of the cushion may be provided with the blades, the end of the cushion may swell in a space in which the lead tab is formed at the time of the swelling of the cushion, and the blades may cut a portion at which the first lead is connected with the second lead.

BRIEF DESCRIPTION OF THE DRAWINGS

The above and other objects, features and advantages of the present disclosure will be more clearly understood from the following detailed description taken in conjunction with the accompanying drawings.

FIGS. 1 and 2 are diagrams illustrating an apparatus for preventing over-charge for a vehicle battery according to an exemplary embodiment of the present disclosure.

FIG. 3 is a diagram illustrating a blade of the apparatus for preventing over-charge for a vehicle battery according to an exemplary embodiment of the present disclosure;

FIGS. 4 and 5 are diagrams illustrating an apparatus for preventing over-charge for a vehicle battery according to another exemplary embodiment of the present disclosure; and FIGS. 6 and 7 are diagrams illustrating an apparatus for preventing over-charge for a vehicle battery according to another exemplary embodiment of the present disclosure.

DETAILED DESCRIPTION

Hereinafter, exemplary embodiments of the present disclosure will be described with reference to the accompanying drawings.

When a specific current is continuously applied due to errors of a vehicle, a battery management system (BMS), or a charging system, a cell swells. When the cell swells, an aerator is operated and exploded while a switch of the aerator, which is in an opened state, is closed. Nitrogen is generated from a gas generator, and thus, an air bag instantly swells. In this case, a welded portion or a lead tab within the cell or a welded portion of the lead tab is separated using a swelling force itself or a non-metallic structure, and thus, a current does no longer flow.

A cell voltage in a normal situation does not exceed 4.2 or 4.3V. When the current is abnormally applied to the cell continuously, a voltage rises, and is the cell swells. When the cell swells maximally is about 5 to 6 V. In this situation, the aerator becomes an operating voltage/current, and thus is exploded while a switch of two swelled cells is closed.

The nitrogen is generated from the gas generator due to the explosion, and thus, the air bag swells. The welded portion or the lead tab is broken by the swelling force itself or the non-metallic structure using the force, and thus, no current is applied.

When the switch of the aerator is closed due to the swelling of the cell, a receptacle terminal needs to include a proper resistor so as to prevent a large current from suddenly flowing. In the case of the air bag for a vehicle, acceleration/pressure/collision sensors and the like are required. However, in the exemplary embodiment of the present disclosure, the air bag makes the structurally closed circuit when the cell is simply swelled, and thus, the aerator is operated. Since a specific voltage or current is required to operate the aerator, a receptacle/clip required to connect with cells each other is used to obtain serial/parallel connections of the cells which correspond to as much as the voltage at the time of the swelling.

FIGS. 1 and 2 are diagrams illustrating an apparatus for preventing over-charge for a vehicle battery according to an exemplary embodiment of the present disclosure. FIG. 3 is a diagram illustrating a blade of the apparatus for preventing over-charge for a vehicle battery according to an exemplary embodiment of the present disclosure. FIGS. 4 and 5 are diagrams illustrating an apparatus for preventing over-charge for a vehicle battery according to another exemplary embodiment of the present disclosure. FIGS. 6 and 7 are diagrams illustrating an apparatus for preventing over-charge for a vehicle battery according to another exemplary embodiment of the present disclosure.

According to an exemplary embodiment of the present disclosure as illustrated in FIG. 1, an apparatus for preventing over-charge for a vehicle battery includes a switch 200 configured to be disposed between an adjacent battery cell 10 and a battery cell 10' and closely contacts the battery cells 10 and 10' to form a contact when the battery cells 10 and 10' swell. An inflator 300 is configured to be exploded when connecting the switch 200. A cushion 400 is disposed between the adjacent battery cell 10 and battery cell 10' and swells depending on the explosion of the inflator 300 to cut a lead tab 100 which connects the adjacent battery cell 10 and the battery cell 10'.

The switch 200 is configured of two contacts 220 and 240 and is disposed between the adjacent battery cell 10 and the battery cell 10'. The switch 200 closely contacts the battery cells 10 and 10' when each of the battery cells 10 and 10' swell to form the contact. As illustrated, when the switch 200 is connected to the lead tab 100 of each of the battery cells 10 and 10' to form the contact, the switch 200 applies a current to the inflator 300. Therefore, the inflator 300 is exploded when connecting the switch 200. Further, the cushion 400 is disposed between the adjacent battery cell 10 and the battery cell 10' and swells depending on the explosion of the inflator 300 to cut the lead tab 100 which connects the adjacent battery cell 10 and the battery cell 10'. Therefore, as illustrated in FIG. 2, the lead tab 100 is disconnected due to the swelling of the cushion 400, and the battery cells 10 and 10' are no more charged.

The switch 200 is disposed at a central portion between the adjacent battery cell 10 and the battery cell 10', and the inflator 300 and the cushion 400 may be disposed at an upper or lower portion between the adjacent battery cell 10 and the battery cell 10'. Further, the cushion 400 may be disposed at the lead tab 100 part connecting the adjacent battery cell 10 and the battery cell 10'. Therefore, a cutting force may be easily concentrated on the lead tab 100 even by a small swelling.

As illustrated in FIG. 3, the lead tab 100 is provided with a plurality of holes 101, an end of the cushion 400 is provided with blades 420 corresponding to the plurality of holes 101, and the lead tab 100 may be entirely cut from the plurality of holes 101 by the blades 420 at the time of the swelling of the cushion 400. The blades 420 are formed of a non-metallic nonconductor to stably cut the lead tab 100, and the cut lead tab is insulated.

According to another exemplary embodiment of the present disclosure as illustrated in FIG. 4, the lead tab 100 has a shape in which a first lead 120 is connected with a second lead 140. The cushion 400 may extend to the lead tab 100 in the state in which the cushion 400 is connected with the inflator 300. Further, the end of the cushion 400 is provided with the blades 420, the end of the cushion 400 swells in a space in which the lead tab 100 is formed at the time of the swelling of the cushion 400, and the blades 420 may cut the first lead 120 or the second lead 140. As a result, referring to FIG. 5, a lead of the lead tab 100 is disconnected. Further, in this case, the cushion 400 is interposed between the outside housing 30 of the battery cell and the battery cell 10', and thus may be implemented through a small-capacity inflator 300. A housing 30 is provided with a through hole 32 to form the contact of the switch 200.

According to another exemplary embodiment of the present disclosure as illustrated in FIG. 6, the end of the cushion 400 is provided with the blades 420, the end of the cushion 400 swells in a space in which the lead tab 100 is formed at the time of the swelling of the cushion 400. The blades 420 may cut a portion at which the first lead 120 is connected with the second lead 140. Therefore, as illustrated in FIG. 7, the lead tab 100 and the portion at which the first lead 120 is connected with the second lead 140 are simultaneously cut.

According to the apparatus for preventing over-charge for a vehicle battery having the above structure, the contacts contact each other even though the battery cell is swelled relatively small to operate the apparatus even in the state which the over-charge is not considerably progressed, and even the welded portion of the lead which is hardly separated due to the swelling of the air bag with the strong force may be separated.

The portion in which electricity flows is at once separated with the strong swelling force at the time of overcharging, such that the side effects may be removed.

The apparatus for preventing over-charge for a vehicle battery has the structure of interrupting a current in the state in which the cell swelling is not maximally progressed, thereby preventing ignition/explosion due to latent heat or an additional heat generation within the cell.

The apparatus for preventing over-charge for a vehicle battery has the structure which is disposed between the cells or between the outside cell and the housing, thereby minimizing the occupied space, and may be applied anywhere by securing the space, if necessary.

Even in the existing module and pack structure, the apparatus for preventing over-charge for a vehicle battery may be applied without largely changing the design.

It is possible to prevent the ignition/explosion due to overcharging by installing the apparatus for preventing over-charge for a vehicle battery in either the module structure or the pack structure.

The apparatus for preventing over-charge for a vehicle battery uses the swelling force which may be generated at the time of overcharging the cell, such that the safety may be secured independent of errors of an electronic system such as controlling/charging.

The damage of a vehicle and a human life may be minimized by preventing the ignition or explosion of the battery which may occur at the time of overcharging.

Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:

1. An apparatus for preventing over-charge for a vehicle battery, the apparatus comprising:
    a switch disposed between an adjacent battery cell and a battery cell and closely contacting the battery cells at the time of swelling of each of the battery cells and to form a contact;
    an inflator configured to be exploded at the time of a connection of the switch; and
    a cushion disposed between the adjacent battery cell and the battery cell and configured to swell depending on the explosion of the inflator to cut a lead tab which connects the adjacent battery cell and the battery cell.

2. The apparatus of claim 1, wherein the switch is disposed at a central portion between the adjacent battery cell and the battery cell and the inflator and the cushion are at an upper or lower portion between the adjacent battery cell and the battery cell.

3. The apparatus of claim 2, wherein the cushion is disposed adjacent the lead tab which connects the adjacent battery cell and the battery cell.

4. The apparatus of claim 1, wherein the lead tab has a plurality of holes, an end of the cushion has blades corresponding to the plurality of holes, and the lead tab is entirely cut from the plurality of holes by the blades at the time of the swelling of the cushion.

5. The apparatus of claim 1, wherein the lead tab has a shape in which a first lead is connected with a second lead and the cushion extends to the lead tab in the state in which the cushion is connected with the inflator.

6. The apparatus of claim 5, wherein an end of the cushion has blades, the end of the cushion swells in a space in which the lead tab is formed at the time of the swelling of the cushion, and the blades cut the first lead or the second lead.

7. The apparatus of claim 5, wherein an end of the cushion has blades, the end of the cushion swells in a space in which the lead tab is formed at the time of the swelling of the cushion, and the blades cut a portion at which the first lead is connected with the second lead.

* * * * *